(12) United States Patent
Weng

(10) Patent No.: US 12,082,316 B2
(45) Date of Patent: Sep. 3, 2024

(54) INTELLIGENT MUSIC LAMP STRING

(71) Applicant: Yunbing Weng, Taizhou (CN)

(72) Inventor: Yunbing Weng, Taizhou (CN)

(*) Notice: Subject to any disclaimer, the term of this patent is extended or adjusted under 35 U.S.C. 154(b) by 0 days.

(21) Appl. No.: 17/586,669

(22) Filed: Jan. 27, 2022

(65) Prior Publication Data

US 2023/0217560 A1 Jul. 6, 2023

(30) Foreign Application Priority Data

Jan. 5, 2022 (CN) .......................... 202220012342.5

(51) Int. Cl.
*H05B 45/10* (2020.01)
*F21V 33/00* (2006.01)
*F21Y 115/10* (2016.01)
*G06F 3/16* (2006.01)
*H05B 47/105* (2020.01)

(52) U.S. Cl.
CPC ......... *H05B 45/10* (2020.01); *F21V 33/0056* (2013.01); *G06F 3/16* (2013.01); *H05B 47/105* (2020.01); *F21Y 2115/10* (2016.08)

(58) Field of Classification Search
CPC ... H05B 45/10; H05B 47/105; F21V 33/0056; G06F 3/16; F21Y 2115/10
See application file for complete search history.

(56) References Cited

U.S. PATENT DOCUMENTS

2015/0084515 A1* 3/2015 Altamura ............... H05B 45/20
315/131

* cited by examiner

*Primary Examiner* — Alicia M Harrington
*Assistant Examiner* — Jessica M Apenteng

(57) ABSTRACT

The present disclosure provides an intelligent music lamp string. The intelligent music lamp string includes a human body sensing module, a control module, a music control module and a lamp string. The human body sensing module is configured to sense a human body and output a sensing signal when the human body is sensed. The control module is configured to receive the sensing signal and output an enable signal and a control signal according to the sensing signal. The music control module is configured to receive the enable signal and play a predetermined music according to the enable signal. The lamp string is configured to receive the control signal and start to work according to the control signal, a duty cycle of the control signal in each cycle corresponding to beats of each section of the predetermined music.

16 Claims, 1 Drawing Sheet

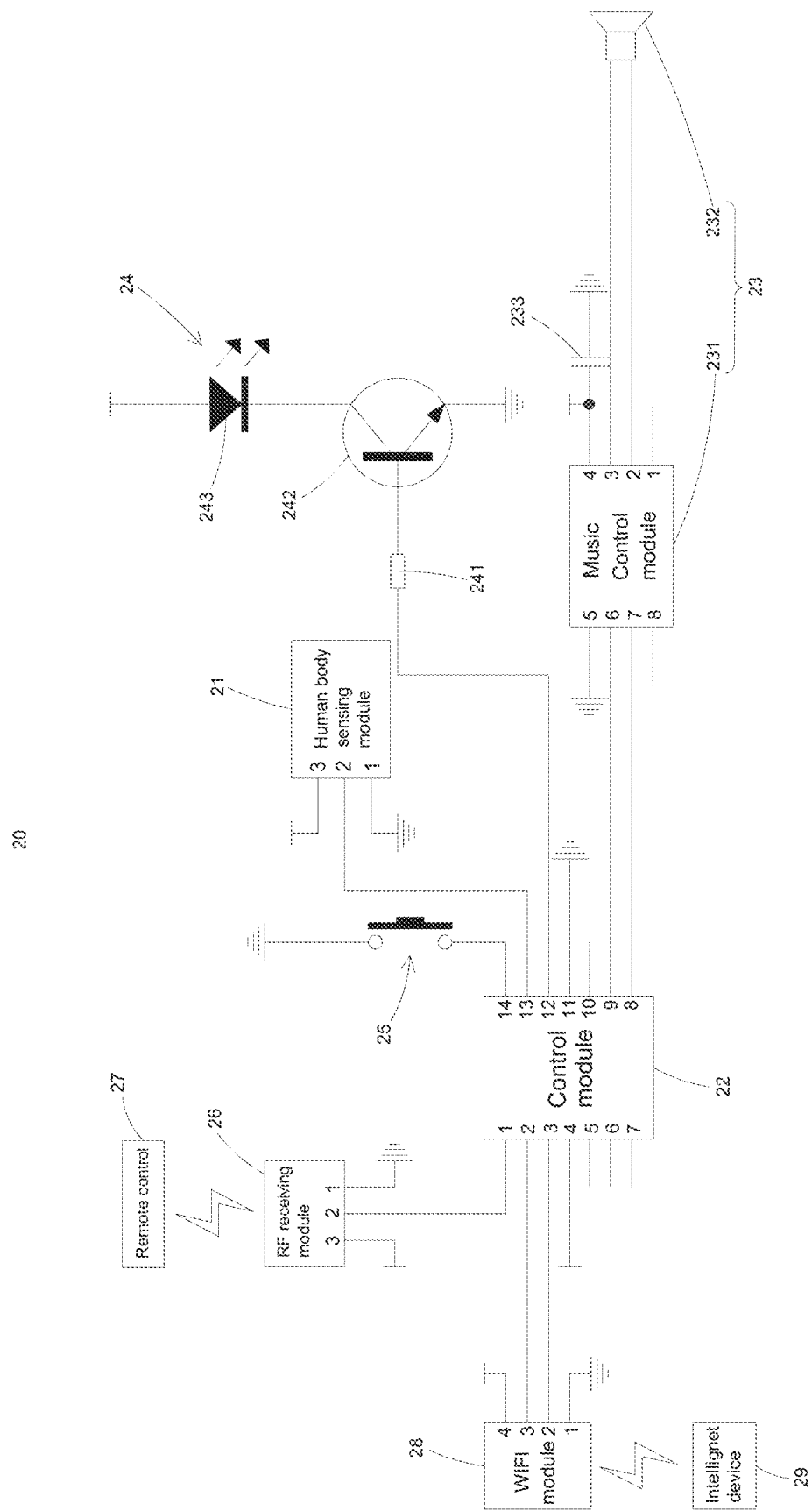

INTELLIGENT MUSIC LAMP STRING

CROSS-REFERENCE TO RELATED APPLICATIONS

This application claims priority to CHINESE Patent Application No. 2022200123425, entitled "AN INTELLIGENT MUSIC LAMP STRING" which was filed on Jan. 5, 2022, the entire contents of which are incorporated by reference herein.

FIELD OF THE INVENTION

The present disclosure relates to lamp string technology field, and specifically to an intelligent music lamp string.

BACKGROUND OF THE INVENTION

With the improvement of living standards, people have higher and higher requirements for the living environment. In festivals, parties and other scenes, decorations such as lamp strings, wool tops, sequins and balloons are usually used to decorate the environment and set off the atmosphere. Among them, a music lamp string has become the first choice to add festival atmosphere in the festival because of its music effect.

However, the existing music lamp string usually only receives music signals through a microphone to realize a musical rhythm of the lamp string, using range of the existing music lamp string is limited.

SUMMARY OF THE INVENTION

In order to overcome the disadvantage of the existing music lamp string, the present disclosure provides an intelligent music lamp string, which can realize a musical rhythm without an external drive (such as, for example, a microphone) and has the advantages of low cost.

The present disclosure adopts the following technical solution: an intelligent music lamp string including a human body sensing module configured to sense a human body and output a sensing signal when the human body is sensed; a control module connected with the human body sensing module, the control module configured to receive the sensing signal and output an enable signal and a control signal according to the sensing signal, the enable signal and the control signal being outputted by different output terminals; a music control module connected with the control module, the music control module configured to receive the enable signal and play a predetermined music according to the enable signal; and a lamp string connected with the control module, the lamp string configured to receive the control signal and start to work according to the control signal, a duty cycle of the control signal in each cycle corresponding to beats of each section of the predetermined music.

Further, the music control module includes a music chip and a horn, an enable end of the music chip is connected with the control module, and an output end of the music chip is connected with the horn, the predetermined music is stored in the music chip, and when the music chip receives the enable signal, the music chip controls the horn to play the predetermined music.

Further, the intelligent music lamp string includes comprises a button, an end of the button is connected with the control module, the other end of the button is grounded, the button is configured to control the control module output different adjusting signals to the music chip, the music chip is configured to adjust a volume of the horn according to the adjusting signals.

Further, a chip model of the control module is FMD FT61XX, a chip model of the human body sensing module is RCWL-0517, and a chip model of the music chip is EV3P087J.

Further, the lamp string comprises a protection resistance, an NPN type transistor and an LED string, an end of the protection resistance is connected with the control module, the other end of the protection resistance is connected with a base of the NPN type transistor, a collector of the NPN type transistor is connected with a negative electrode of the LED string, an emitter of the NPN type transistor is grounded, a positive electrode of the LED string is configured to receive a power signal.

Further, the intelligent music string further comprises a radio frequency receiving module configured to connected with the control module and a remote control and a WIFI module configured to connected with the control module and an intelligent device.

Further, the human body sensing module is configured to sense movement of the human body by a radar in real time so as to sense the human body.

Further, the control signal is generated according to beats of the predetermined music, the beats of each section of the predetermined music comprises a strong beat and a weak beat, when the strong beat is provided, a voltage level of the control signal is high, and when the weak beat is provided, the voltage level of the control signal is low.

The present disclosure also adopts the following technical solution: an intelligent music lamp string including a human body sensing module configured to sense a human body and output a sensing signal; a control module connected with the human body sensing module, the control module configured to receive the sensing signal and output an enable signal and a control signal according to the sensing signal; a music control module connected with the control module, the music control module configured to receive the enable signal and play a predetermined music according to the enable signal; and a lamp string connected with the control module, the lamp string configured to receive the control signal and shine according to the control signal, a duty cycle of the control signal in each cycle corresponding to beats of each section of the predetermined music.

The intelligent music lamp string, wherein the music control module comprises a music chip and a horn, an enable end of the music chip is connected with the control module, and an output end of the music chip is connected with the horn, the predetermined music is stored in the music chip, and when the music chip receives the enable signal, the music chip controls the horn to play the predetermined music.

Further, the intelligent music lamp string further includes a button, an end of the button is connected with the control module, the other end of the button is grounded, the button is configured to control the control module output different adjusting signals to the music chip, the music chip is configured to adjust a volume of the horn according to the adjusting signals.

Further, a chip model of the control module is FMD FT61XX, a chip model of the human body sensing module is RCWL-0517, and a chip model of the music chip is EV3P087J.

Further, the lamp string comprises a protection resistance, a transistor and an LED string, an end of the protection resistance is connected with the control module, the other end of the protection resistance is connected with a control terminal of the transistor, a first connection terminal of the transistor is connected with a negative electrode of the LED string, a second connection terminal of the transistor is grounded, a positive electrode of the LED string is configured to receive a power signal, when the control terminal of the transistor receives the control signal, the NPN type transistor is turned on or turned off according to the control signal, so as to control the LED string shine.

Further, the intelligent music string further includes a radio frequency receiving module configured to connected with the control module and a remote control and a wireless module configured to connected with the control module and an intelligent device.

Further, the wireless module is selected from the group of a WIFI module, a bluetooth module and a 4G/5G module.

Further, the human body sensing module is configured to sense movement of the human body by a radar in real time so as to sense the human body.

Further, the control signal is generated according to beats of the predetermined music, the beats of each section of the predetermined music comprises a strong beat and a weak beat, when the strong beat is provided, a voltage level of the control signal is a first voltage level, and when the weak beat is provided, the voltage level of the control signal is a second voltage level different from the first voltage level.

Further, the first voltage level is high level, and the second voltage level is low level.

The present disclosure also has the beneficial effects: through the above structure, the human body sensing module senses the human body in real time and outputs the sensing signal when the human body is sensed; the control module receives the sensing signal and outputs an enable signal and a control signal according to the sensing signal, the enable signal and the control signal are outputted by different output terminals; the music control module receives the enable signal and play a predetermined music according to the enable signal; the lamp string receives the control signal and start to work according to the control signal, a duty cycle of the control signal in each cycle corresponds to beats of each section of the predetermined music, then, the lamp string shines according to the beats of the predetermined music without an external drive (such as a microphone) and has the advantages of low cost.

BRIEF DESCRIPTIONS OF THE DRAWINGS

For the purpose of a clearer description of the embodiments in this application or technical solutions in prior art, below is a brief introduction of the attached drawings needed to be used in the description of the embodiments or prior art. Apparently, the attached drawings in the following description are only some embodiments indicated in the present application. For ordinary skill in the art, they may obtain other drawings according to these attached drawings without any innovative laboring.

The present disclosure will be further described with reference to the attached drawings and the embodiments hereunder.

FIG. 1 is a circuit diagram of an intelligent music lamp string according to an embodiment of the present disclosure.

DETAILED DESCRIPTION OF THE ILLUSTRATED EMBODIMENT

In order to provide a clear understanding of the objects, features, and advantages of the embodiments, the following are detailed and complete descriptions to the technological solutions adopted in the embodiments. Obviously, the descriptions are part of the whole embodiments. The other embodiments which are not processed creatively by technicians of ordinary skills in the field are under the protection of this disclosure. The same is given with reference to the drawings and specific embodiments. It should be noted that non-conflicting embodiments in the disclosure and the features in the embodiments may be combined with each other without conflict.

In the following description, numerous specific details are set forth in order to provide a full understanding of the disclosure. The disclosure may be practiced otherwise than as described herein. The following specific embodiments are not to limit the scope of the disclosure.

Unless defined otherwise, all technical and scientific terms herein have the same meaning as used in the field of the art as generally understood. The terms used in the disclosure are to describe particular embodiments and are not intended to limit the disclosure.

The disclosure, referencing the accompanying drawings, is illustrated by way of examples and not by way of limitation. It should be noted that references to "an" or "one" embodiment in this disclosure are not necessarily to the same embodiment, and such references mean "at least one."

Referring to FIG. 1, an intelligent music lamp string 20 includes a human body sensing module 21, a control module 22 connected with the human body sensing module 22, a music control module 23 connected with the control module 22 and a lamp string 24 connected with the control module 22. The human body sensing module 21 is configured to sense a human body and output a sensing signal when the human body is sensed. The control module 22 is configured to receive the sensing signal and output an enable signal and a control signal according to the sensing signal, and the enable signal and the control signal is outputted by different output terminals of the control module 22. The music control module 23 is configured to receive the enable signal and play a predetermined music according to the enable signal. The lamp string 24 is configured to receive the control signal and start to work according to the control signal, and a duty cycle of the control signal in each cycle corresponds to a beat of each section of the predetermined music.

Further, a chip model of the control module 22 is FMD FT61XX, and a chip model of the human body sensing module 21 is RCWL-0517. The control module 22 includes fourteen pins numbered 1-14, the number 4 pin of the control module 22 is connected with a power source to receive a power signal V+, and the number 11 pin of the control module 22 is grounded. The human body sensing module 21 senses movement of the human body by a radar in real time so as to sense the human body. The human body sensing module 21 includes three pins numbered 1-3, the number 3 pin of the human body sensing module 21 is connected with the power source to receive the power signal V+, the number 1 pin of the human body sensing module 21 is grounded, and the number 2 pin of the human body sensing module 21 is connected with the number 13 pin of the control module 22. When the human body is sensed by the human body sensing module 21, the number 2 pin of the human body sensing module 21 outputs the sensing signal and provides the sensing signal to the number 13 pin of the control module 22 so as to provide the sensing signal to the control module 22. When the control module 22 receives the sensing signal, the control module 22 outputs the enable signal through the number 9 pin and outputs the control signal through the number 12 pin.

The intelligent music lamp string 20 further includes a button 25, an end of the button is connected with the control module 22, and the other end of the button 25 is grounded. The button 25 is configured to control the control module 22 output different adjusting signals through the number 8 pin.

The music control module 23 includes a music chip 231 and a horn 232, an enable end of the music chip 231 is connected with the control module, 22 and an output end of the music chip 231 is connected with the horn 232. A chip model of the music chip 231 is EV3P087J, and the music chip 231 includes eight pins numbered 1-8. The number 4 pin of the music chip 231 is connected with the power source to receive the power signal V+ and is grounded via a capacitance 233, the number 5 pin of the music chip 231 is grounded, the number 2 pin and the number 3 pin of the music chip 231 are connected with a positive electrode and a negative electrode of the horn 232 respectively, the number 6 pin and the number 7 pin of the music chip 231 is connected with the number 9 pin and the number 8 pine of the control module 22. The predetermined music is stored in the music chip 231, and when the music chip 231 receives the enable signal, the music chip 231 controls the horn 232 to play the predetermined music. When the music chip 231 receives an adjusting signal from the number 8 pin of the control module 22, the music chip 231 adjusts a volume of the horn 232 according to the adjusting signal.

Further, the lamp string 24 includes a protection resistance 241, an NPN type transistor 242 and an LED string 243, an end of the protection resistance 241 is connected with the control module 22, the other end of the protection resistance 241 is connected with a base of the NPN type transistor 242, a collector of the NPN type transistor 242 is connected with a negative electrode of the LED string, 243 an emitter of the NPN type transistor 242 is grounded, a positive electrode of the LED string 243 is configured to receive the power signal V+ from the power source. When the base of the NPN type transistor 242 receives the control signal from the number 12 pin of the control module 22, the NPN type transistor 242 is turned on or turned off according to the control signal, so as to control the LED string 243 shine. Because the duty cycle of the control signal in each cycle corresponds to a beat of each section of the predetermined music, the LED string 243 shines according to the beats of the predetermined music. That is, the lamp string 24 shines according to the beats of the predetermined music without an external drive (such as a microphone) and has the advantages of low cost.

It can be understood, the predetermined music has definite beats, and the control signal can be generated through artificial way according to the definite beats of the predetermined music. For example, the beats of each section of the predetermined music includes a strong beat and a weak beat, when the strong beat is provided, a voltage level of the control signal is high, and when the weak beat is provided, the voltage level of the control signal is low. The strong beat and the weak beat are provided periodically. Therefore, the control signal can control the LED string 243 shine with a musical rhythm of the predetermined music. It can be understood, the duty cycle of the control signal is defined by the high voltage level in a period.

The intelligent music string 20 further includes a radio frequency (RF) receiving module 26 configured to connected with the control module 22 and a remote control 27 and a WIFI module 28 configured to connected with the control module 22 and an intelligent device 29. Through above structure, the intelligent music string 20 can be controlled by the remote control 27 and the intelligent device 29.

The intelligent device 29 can be, for example, a mobile phone, a tablet computer, etc. Of course, the WIFI module 28 can also be replaced by a bluetooth module or a 4G/5G module.

Specifically, the WIFI module 28 may includes four pins numbered 1-4, the number 4 pin of the WIFI module 28 is connected to the power source to receive the power voltage V+, the number 1 pin of the WIFI module 28 is grounded, and the number 3 pin and the number 2 pin of the WIFI module 28 are connected to the number 2 pin and the number 2 pin of the control module 22 respectively. The RF receiving module 26 includes three pins numbered 1-3, the number 3 pin of the RF receiving module 26 is connected to the power source to receive the power voltage V+, the number 1 pin of the RF receive module 26 is grounded, and the number 2 pin of the RF receive module 26 is connected to the number 1 pin of the control module 22.

The present disclosure also has the beneficial effects: through the above structure, the human body sensing module 21 senses the human body in real time and outputs the sensing signal when the human body is sensed; the control module 22 receives the sensing signal and outputs an enable signal and a control signal according to the sensing signal, the enable signal and the control signal are outputted by different output terminals; the music control module 23 receives the enable signal and play a predetermined music according to the enable signal; the lamp string 24 receives the control signal and start to work according to the control signal, a duty cycle of the control signal in each cycle corresponds to beats of each section of the predetermined music, then, the lamp string 24 shines according to the beats of the predetermined music without an external drive (such as a microphone) and has the advantages of low cost.

Finally, it should be noted that above embodiments are merely used for illustrating the technical solutions of the disclosure, rather than limiting the disclosure; though the disclosure is illustrated in detail with reference to the aforementioned embodiments, it should be understood by those of ordinary skill in the art that modifications may still be made on the technical solutions disclosed in the aforementioned respective embodiments, or equivalent substitutions may be made to a part of technical features thereof; and these modifications or substitutions do not make the essence of the corresponding technical solutions depart from the spirit and scope of the technical solutions of the respective embodiments of the disclosure.

What is claimed is:

1. An intelligent music lamp string, comprising:
   a human body sensing module configured to sense a human body and output a sensing signal when the human body is sensed;
   a control module connected with the human body sensing module, the control module configured to receive the sensing signal and output an enable signal and a control signal according to the sensing signal, the enable signal and the control signal being outputted by different output terminals;
   a music control module connected with the control module, the music control module configured to receive the enable signal and play a predetermined music according to the enable signal;
   a lamp string connected with the control module, the lamp string configured to receive the control signal and start to work according to the control signal, a duty cycle of the control signal in each cycle corresponding to beats of each section of the predetermined music; and wherein the music control module comprises a music chip and a horn, an enable end of the music chip is connected with the control module, and an output end of the music chip is connected with the horn, the predetermined music is stored in the music chip, and when the music chip receives the enable signal, the music chip controls the horn to play the predetermined music.

2. The intelligent music lamp string of claim 1, wherein the intelligent music lamp string further comprises a button, an end of the button is connected with the control module, the other end of the button is grounded, the button is configured to control the control module output different adjusting signals to the music chip, the music chip is configured to adjust a volume of the horn according to the adjusting signals.

3. The intelligent music lamp string of claim 1, wherein a chip model of the control module is FMD FT61XX, a chip model of the human body sensing module is RCWL-0517, and a chip model of the music chip is EV3P087J.

4. The intelligent music lamp string of claim 1, wherein the lamp string comprises a protection resistance, an NPN type transistor and an LED string, an end of the protection resistance is connected with the control module, the other end of the protection resistance is connected with a base of the NPN type transistor, a collector of the NPN type transistor is connected with a negative electrode of the LED string, an emitter of the NPN type transistor is grounded, a positive electrode of the LED string is configured to receive a power signal.

5. The intelligent music lamp string of claim 1, wherein the intelligent music string further comprises a radio frequency receiving module configured to connected with the control module and a remote control and a WIFI module configured to connected with the control module and an intelligent device.

6. The intelligent music lamp string of claim 1, wherein the human body sensing module is configured to sense movement of the human body by a radar in real time so as to sense the human body.

7. The intelligent music lamp string of claim 1, wherein the control signal is generated according to beats of the predetermined music, the beats of each section of the predetermined music comprises a strong beat and a weak beat, when the strong beat is provided, a voltage level of the control signal is high, and when the weak beat is provided, the voltage level of the control signal is low.

8. An intelligent music lamp string, comprising:
a human body sensing module configured to sense a human body and output a sensing signal;
a control module connected with the human body sensing module, the control module configured to receive the sensing signal and output an enable signal and a control signal according to the sensing signal;
a music control module connected with the control module, the music control module configured to receive the enable signal and play a predetermined music according to the enable signal;
a lamp string connected with the control module, the lamp string configured to receive the control signal and shine according to the control signal, a duty cycle of the control signal in each cycle corresponding to beats of each section of the predetermined music; and wherein the music control module comprises a music chip and a horn, an enable end of the music chip is connected with the control module, and an output end of the music chip is connected with the horn, the predetermined music is stored in the music chip, and when the music chip receives the enable signal, the music chip controls the horn to play the predetermined music.

9. The intelligent music lamp string of claim 8, wherein the intelligent music lamp string further comprises a button, an end of the button is connected with the control module, the other end of the button is grounded, the button is configured to control the control module output different adjusting signals to the music chip, the music chip is configured to adjust a volume of the horn according to the adjusting signals.

10. The intelligent music lamp string of claim 9, wherein a chip model of the control module is FMD FT61XX, a chip model of the human body sensing module is RCWL-0517, and a chip model of the music chip is EV3P087J.

11. The intelligent music lamp string of claim 8, wherein the lamp string comprises a protection resistance, a transistor and an LED string, an end of the protection resistance is connected with the control module, the other end of the protection resistance is connected with a control terminal of the transistor, a first connection terminal of the transistor is connected with a negative electrode of the LED string, a second connection terminal of the transistor is grounded, a positive electrode of the LED string is configured to receive a power signal, when the control terminal of the transistor receives the control signal, the NPN type transistor is turned on or turned off according to the control signal, so as to control the LED string shine.

12. The intelligent music lamp string of claim 8, wherein the intelligent music string further comprises a radio frequency receiving module configured to connected with the control module and a remote control and a wireless module configured to connected with the control module and an intelligent device.

13. The intelligent music lamp string of claim 12, wherein the wireless module is selected from the group of a WIFI module, a bluetooth module and a 4G/5G module.

14. The intelligent music lamp string of claim 8, wherein the human body sensing module is configured to sense movement of the human body by a radar in real time so as to sense the human body.

15. The intelligent music lamp string of claim 8, wherein the control signal is generated according to beats of the predetermined music, the beats of each section of the predetermined music comprises a strong beat and a weak beat, when the strong beat is provided, a voltage level of the control signal is a first voltage level, and when the weak beat is provided, the voltage level of the control signal is a second voltage level different from the first voltage level.

16. The intelligent music lamp string of claim 15, wherein the first voltage level is high level, and the second voltage level is low level.

* * * * *